Feb. 6, 1923.
E. R. MAXIM
1,444,626
AUGER, ROUTER, OR LIKE TOOL FOR BORING OR SINKING OPERATIONS IN WOOD OR OTHER SOFT MATERIALS
Filed May 15, 1922
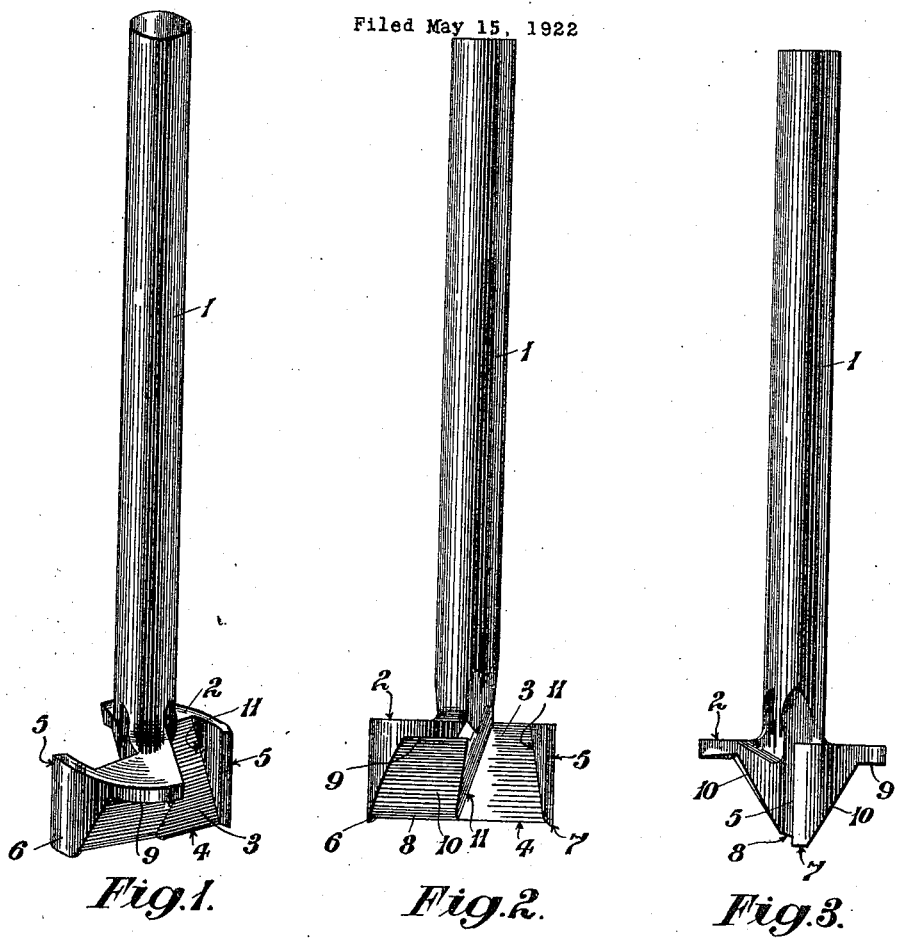
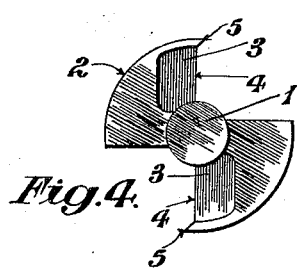
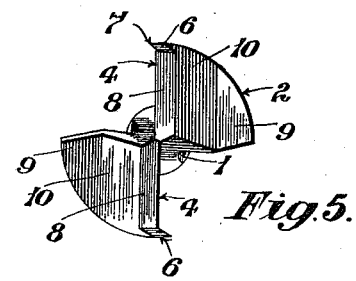
INVENTOR
Edward R. Maxim,
BY Bright & Bailey
Attys.

Patented Feb. 6, 1923.

1,444,626

UNITED STATES PATENT OFFICE.

EDWARD ROBERT MAXIM, OF CAMBRIDGE, ENGLAND.

AUGER, ROUTER OR LIKE TOOL FOR BORING OR SINKING OPERATIONS IN WOOD OR OTHER SOFT MATERIALS.

Application filed May 15, 1922. Serial No. 560,977.

*To all whom it may concern:*

Be it known that I, EDWARD ROBERT MAXIM, subject of the King of Great Britain, residing at 96 Russell Street, Hills Road, Cambridge, England, have invented new and useful Improvements in Augers, Routers or like Tools for Boring or Sinking Operations in Wood or Other Soft Materials; and I do hereby declare the following to be a full, clear, and exact description in the invention, such as will enable others skilled in the art to which it appertains to make and use the same.

This invention relates to augers, routers or like tools for boring or sinking operations in wood or other soft materials.

The object of the present invention is to provide an improved tool of the above character which will not choke and which may be run at a comparatively high speed and coarse feed without overheating.

The invention consists broadly of an auger, router or like tool having a circular head the continuity of which is broken by at least two cut away portions arranged on opposite sides of a diameter, each such portion comprising a straight surface which slopes rearwardly away from the direction of rotation and has a knife edge at the bottom and a further knife edge constituted by the edge of the broken periphery of the head the sides of which head may be either parallel or taper.

In order that the invention may be clearly understood an embodiment of the same will now be described by aid of the accompanying drawings in which:—

Fig. 1 is a top perspective view of the tool.

Fig. 2 is a side elevation of the same.

Fig. 3 is a similar view to Fig. 2 but taken at right angles to the same.

Fig. 4 is a top plan of the tool.

Fig. 5 is an underside plan of the same.

The tool shown by way of example in the drawings consists of a shank 1 and an enlarged, integral and circular head 2 the continuity of which is broken by two cut away portions arranged on opposite sides of a diameter, each such portion consisting of a straight surface 3 which slopes rearwardly away from the direction of rotation, and has a knife edge 4 at the bottom and a further vertical knife edge 5 constituted by the edge of the broken periphery of the head 2.

The bottom of each of the vertical knife edges 5 are continued beyond the knife edges 4 as at 6 and such continuations are bevelled to form themselves a knife edge 7, each of which constitutes a lip bordering the backing 8 of each knife edge 4. The head at the back of each surface 3 is cut away to form an overhanging portion 9 and a sloping surface 10 which surfaces are substantially parallel to the surfaces 3.

The knife edges 4 may be of any suitable contour according to the purpose for which the tool is to be employed.

The sides 11 of the surfaces 3 are preferably tapered inwards towards the top of the head as shown so as to increase the thickness of the metal at the sides and to also obviate the necessity of unduly undercutting the shank 1.

By varying the contour of the knife edges 4 and the shape of the head, it is possible to adapt this tool for use as a moulder, circular router, shallow sinker, or a double router.

What I claim is:—

In an auger cutting head, router blades, a peripheral blade in association with each router blade and having its cutting edge in advance of the cutting edge of the related router blade and extending in the same general direction as the axis of the head, and a rearwardly extending overhang at the upper end of each router blade, the outer faces of related router blades, peripheral blades and overhangs forming relatively extensive opposed curved bearing surfaces concentric with the axis of the cutter head.

In witness whereof I have signed this specification in the presence of two witnesses.

EDWARD ROBERT MAXIM.

Witnesses:
GEORGE HUGHES,
C. HUGHES.